(12) United States Patent
Walker

(10) Patent No.: US 7,411,136 B2
(45) Date of Patent: Aug. 12, 2008

(54) MULTIPLE BATCH SYSTEM AND METHOD FOR LOADING RAILCARS OF A WIDE RANGE OF CAPACITIES AND DESIGNS

(76) Inventor: Harold A. Walker, 141 Magnolia Ridge Dr., Jonesborough, TN (US) 37659

( * ) Notice: Subject to any disclaimer, the term of this patent is extended or adjusted under 35 U.S.C. 154(b) by 294 days.

(21) Appl. No.: 11/481,174

(22) Filed: Jul. 3, 2006

(65) Prior Publication Data

US 2008/0000699 A1   Jan. 3, 2008

(51) Int. Cl.
  *B65G 67/04* (2006.01)
  *B65G 67/06* (2006.01)
  *B65G 67/22* (2006.01)
  *G01G 13/00* (2006.01)

(52) U.S. Cl. .......... 177/121; 177/122; 414/21; 414/328; 414/809; 222/77; 141/83

(58) Field of Classification Search .......... 177/120, 177/121, 122; 414/21, 328, 809; 222/55, 222/56, 77; 141/83
See application file for complete search history.

(56) References Cited

U.S. PATENT DOCUMENTS

| | | | |
|---|---|---|---|
| 3,708,026 A * | 1/1973 | Senour | 177/60 |
| 3,944,004 A * | 3/1976 | Lafitte et al. | 177/121 |
| 4,137,976 A * | 2/1979 | Grayson, Jr. | 177/1 |
| 4,284,380 A | 8/1981 | Brumbaugh, Jr. et al. | |
| 4,460,308 A | 7/1984 | Moon et al. | |
| 4,629,392 A | 12/1986 | Campbell et al. | |
| 4,659,274 A | 4/1987 | France | |
| 4,720,024 A * | 1/1988 | Jongerius | 222/14 |
| 4,904,154 A | 2/1990 | Campbell et al. | |
| 5,285,930 A * | 2/1994 | Nielsen | 222/1 |
| 5,772,390 A | 6/1998 | Walker | |
| 5,895,194 A | 4/1999 | Galas et al. | |
| 5,909,999 A | 6/1999 | Manstrom | |
| 6,502,013 B1 * | 12/2002 | Sosnik | 700/240 |

FOREIGN PATENT DOCUMENTS

SU   1291517   2/1987

* cited by examiner

*Primary Examiner*—Randy W Gibson
(74) *Attorney, Agent, or Firm*—Carter & Schnedler, P.A.

(57) ABSTRACT

Multiple-batch train loading systems and methods, for example for loading coal, which are capable of accommodating railcars of a wide range of capacities and designs. Each railcar is loaded with at least a relatively large initial weighed batch having a weight at least approximately equal to the maximum available capacity of a weigh bin, and a relatively small final weighed batch. The initial weighed batch and the final weighed batch are both made up with precision. If required, one or more intermediate weighed batches are loaded into the railcar. The intermediate batches, if required, are made up rapidly, but not necessarily with precision.

4 Claims, 9 Drawing Sheets

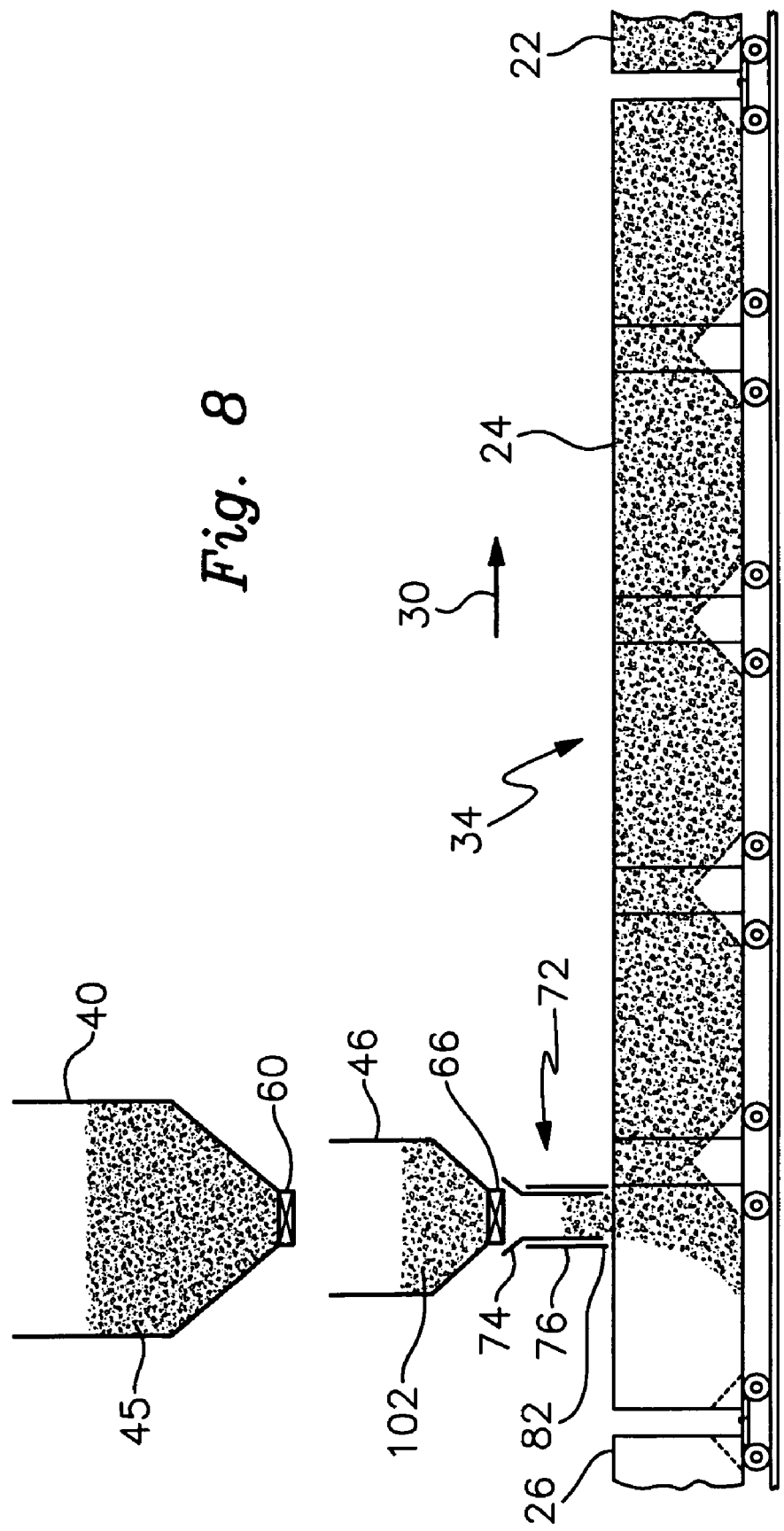

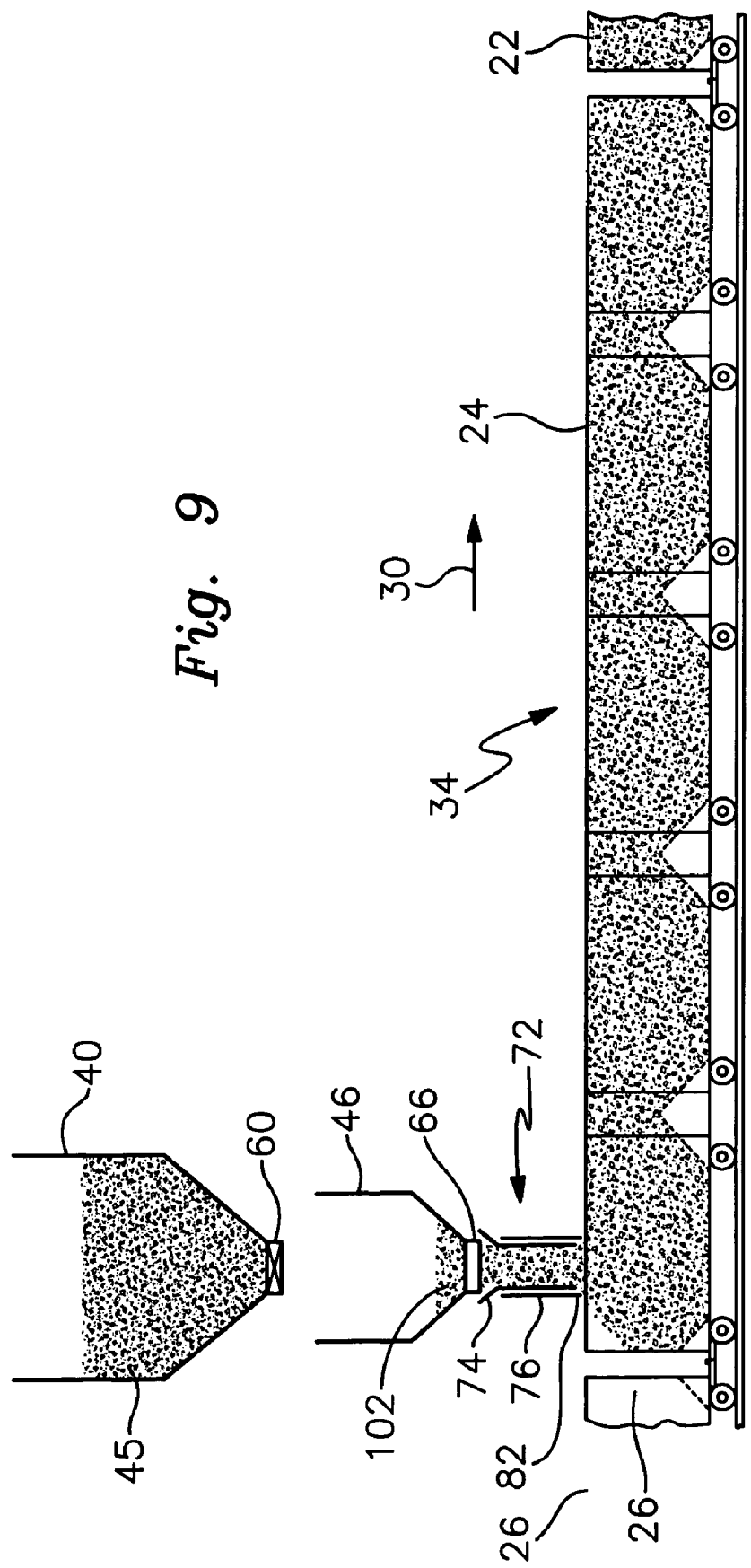

MULTIPLE BATCH SYSTEM AND METHOD FOR LOADING RAILCARS OF A WIDE RANGE OF CAPACITIES AND DESIGNS

BACKGROUND OF THE INVENTION

The invention relates generally to precision loading systems for loading coal or other particulate material into a moving train of railcars and, more particularly, to multiple-batch loading systems and methods which are capable of accommodating railcars of a wide range of capacities and designs.

For economic reasons, it is desirable to accurately load railcars to target weights very near the respective maximum weight capacities of the individual cars. Overloading a railcar is undesirable because equipment damage can result. Underloading is undesirable because railcar capacity is not efficiently utilized.

The capacities and designs of railcars vary greatly, from country to country, as well as within the same country. In the United States, the capacity of a typical railcar is 120 tons (109 metric tons) of coal. However, railcars of much greater capacity are also employed. Thus, at least in the United States, articulated railcars having coal-carrying capacities of up to 500 tons (454 metric tons) are employed. In some other countries, relatively small railcars having capacities ranging from 60 tons (54 metric tons) to 90 tons (82 metric tons) are employed.

As is for example disclosed in Campbell et al U.S. Pat. No. 4,629,392, what may be characterized as a single-batch loading system for loading railroad cars with coal includes a relatively larger surge bin positioned above a relatively smaller weigh bin. Below the surge bin is a controlled charging gate for charging batches of coal from the surge bin into the weigh bin. The weigh bin is mechanically supported on load cells, such that the weight of the weigh bin and coal contained therein can be determined. Below the weigh bin is a controlled discharge gate for discharging coal from the weigh bin through a loading chute into the railroad cars as they travel past below. The surge bin is supplied by a conveyor system which runs substantially continuously while the train is traveling below past the train loading system, at a conveyor rate consistent with the average loading rate as successive railroad cars of the moving train, traveling for example at a speed of one-half mile per hour to one mile per hour (0.8 km/hr to 1.6 km/hr), are loaded.

During operation of such a coal train loading system, the charging gate is opened to charge from the surge bin into the weigh bin a batch of coal having a weight equal to the target weight of coal to be loaded into an individual railroad car, thereby making up a weighed batch of coal. Then, as the railroad car reaches its proper position below the weigh bin and loading chute, the discharge gate is opened, commencing the discharge of the weighed batch of coal from the weigh bin into the railroad car. Ideally, coal flows continuously into the railroad car, filling each railroad car evenly from front to back. Such a single-batch train loading system becomes impractical with relatively larger-capacity railcars.

Thus, for economic reasons, as well as for practical reasons when relatively larger-capacity railcars are to be loaded, it is desirable to employ multiple-batch systems and methods which achieve acceptably high loading rates with smaller, and therefore less costly, facilities. Two-batch, three-batch and four-batch railcar loading systems are known. For example, a three-batch system is disclosed in Walker U.S. Pat. No. 6,155,767.

SUMMARY OF THE INVENTION

In one aspect, a multiple-batch method for loading a moving railcar from front to back with a car target weight of particulate material is provided, and is capable of accommodating railcars of a wide range of capacities and designs. The method employs a train loading system including a surge bin and a weigh bin positioned below the surge bin. The weigh bin has a maximum available capacity as well as a maximum target capacity for a non-precision-charged batch, the maximum target capacity for a non-precision-charged batch being less than the maximum available capacity. The method further employs a controlled and staged charging gate for selectively charging both precision-charged and non-precision-charged batches of particulate material from the surge bin into the weigh bin, and a controlled discharge gate for discharging particulate material from the weigh bin through a loading chute into the railcar. The method includes the steps of at least initially calculating the number and individual target weights of batches in order to load the railcar to the car target weight based on an initial weighed batch having a weight at least approximately equal to the maximum available capacity of the weigh bin, a final weighed batch sized no larger than the amount of particulate material that can be precision-charged into the weigh bin in the time it takes to completely empty the loading chute, and zero or more intermediate weighed batches sized no larger than the maximum target capacity of the weigh bin for a non-precision-charged batch; as the railcar approaches the loading chute, precision-charging the weigh bin with the initial weighed batch of material, and then discharging the initial batch from the weigh bin through the loading chute into the railcar; if one or more intermediate weighed batches are required, while material from a previous batch is flowing from the loading chute into the railcar, non-precision-charging the weigh bin with each intermediate batch of material, and then discharging each intermediate batch from the weigh bin through the loading chute into the railcar; and while material from a previous batch is flowing from the loading chute into the railcar, precision-charging the weigh bin with the final weighed batch, the weight of the final weighed batch being what is required to reach the car target weight after the initial and any intermediate weighed batches are weighed and loaded into the railcar, and then discharging the final batch from the weigh bin through the loading chute into the railcar.

In another aspect, a system for loading successive railcars of a moving train with respective car target weights of particulate material is provided, and is capable of accommodating railcars of a wide range of capacities and designs. The system includes a surge bin and a weigh bin positioned below the surge bin. The weigh bin has a maximum available capacity as well as a maximum target capacity for a non-precision-charged batch, the maximum target capacity for a non-precision-charged batch being less than the maximum available capacity. At least one transducer having a weighing transducer output is connected to the weigh bin for measuring the weight of the weigh bin and particulate material contained therein. The system further includes a controlled and staged charging gate with selective opening sizes for selectively charging both precision-charged and non-precision-charged batches of particulate material from the surge bin into the weigh bin. A loading chute is positioned below the weigh bin for conveying particulate material from the weigh bin into the railcars, and a controlled discharge gate discharges particulate material from the weigh bin. A controller is connected to the transducer output for determining the weight of the weigh bin and particulate material contained therein, is connected to the charging gate for controlling the charging of the weigh bin, and is connected to the discharge gate for controlling discharging from the weigh bin. The controller is operable to at least initially calculate the number and individual target weights of batches in order to load the railcar to the car target weight based on an initial weighed batch having a weight at least approximately equal to the maximum available capacity of the weigh bin, a final weighed batch sized no larger than the amount of particulate material that can be precision-charged into the weigh bin in the time it takes to completely empty the loading chute, and zero or more intermediate weighed batches sized no larger than the maximum target capacity of the weigh bin for a non-precision-charged batch. The controller is further operable, as an individual railcar approaches the loading chute, to open the charging gate and then close the charging gate in stages, while monitoring the weighing transducer output, so as to precision-charge the weigh bin with the initial weighed batch of material; and to open the discharge gate, and then to close the discharge gate when the weigh bin is empty, so as to discharge the initial batch from the weigh bin through the loading chute into the railcar. If one or more intermediate weighed batches are required, the controller is further operable, while material from a previous batch is flowing from the loading chute into the railcar, to open the charging gate, while monitoring the weighing transducer output, so as to non-precision-charge the weigh bin with each intermediate batch of material, to open the discharge gate, and then to close the discharge gate when the weigh bin is empty, so as to discharge each intermediate batch from the weigh bin through the loading chute into the railcar. The controller is further operable, while material from a previous batch is flowing from the loading chute into the railcar, to open the charging gate and then close the charging gate in stages, while monitoring the weighing transducer output, so as to precision-charge the weigh bin with the final weighed batch, the weight of the final weighed batch being what is required to reach the car target weight after the initial and any intermediate weighed batches are weighed and loaded into the railcar; and to open the discharge gate, and then to close the discharge gate when the weigh bin is empty so as to discharge the final batch from the weigh bin through the loading chute into the railcar.

BRIEF DESCRIPTION OF THE DRAWINGS

FIG. 8 depicts a condition during operation when the precision-charged final weighed batch has been made up in the weigh bin; and FIG. 9 depicts the final precision-charged weighed batch being discharged.

DETAILED DESCRIPTION

Figure 1:
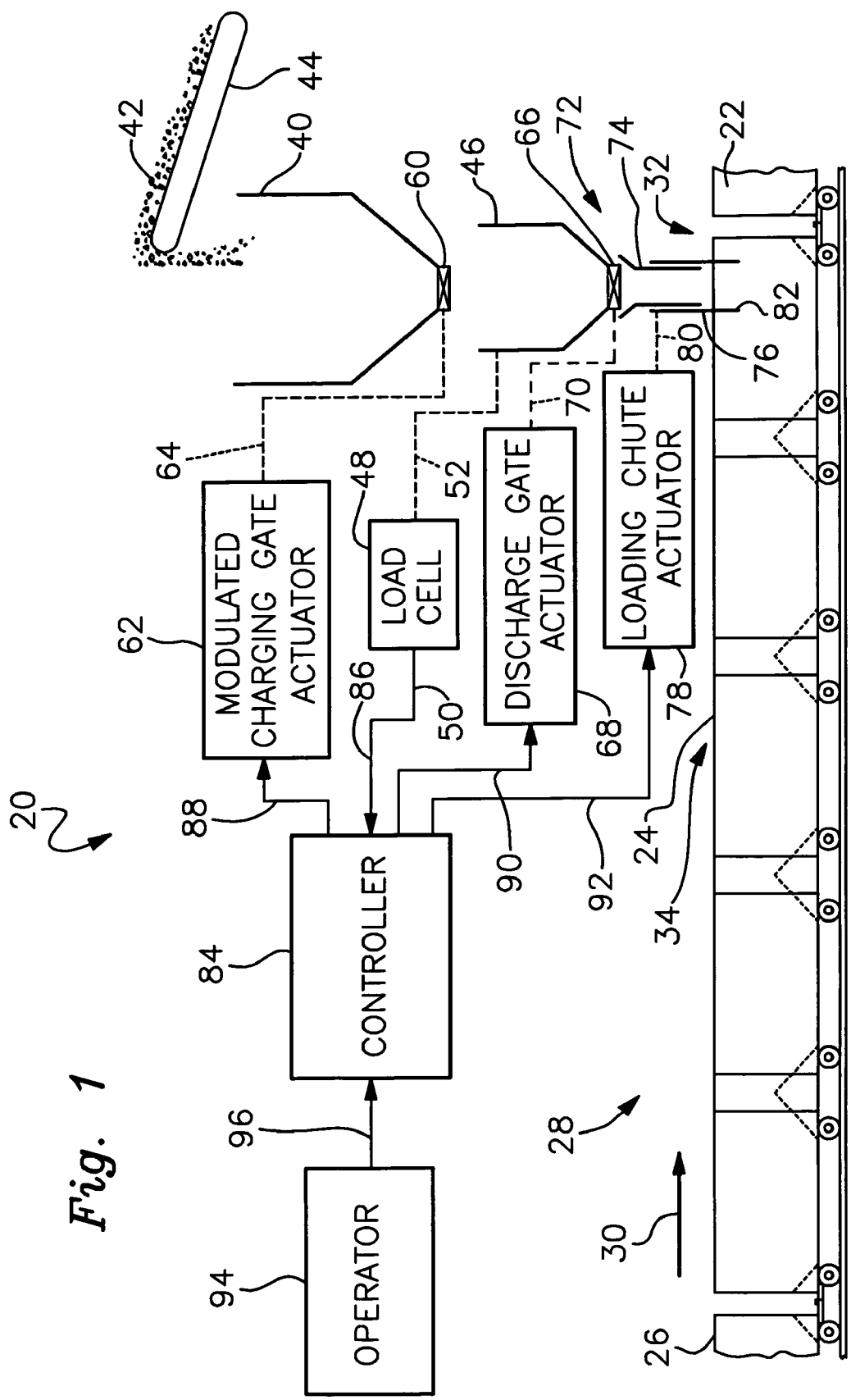
FIG. 1 is a highly schematic representation of a multiple-batch train loading system embodying the invention.

Referring first to FIG. 1, schematically depicted is a multiple-batch train loading system, generally designated 20, for loading successive railcars, such as representative articulated railcars 22, 24 and 26 of a moving train 28, with respective target weights of particulate material, in the disclosed embodiment, coal. (In general, the coal itself is depicted only in FIGS. 2-9, which depict operation of the multiple-batch train loading system 20, as described hereinbelow.) Each of the representative articulated railcars 22, 24 and 26 is approximately 100 feet (30 meters) long, and includes five sections with articulated connectors between the sections so that the articulated railcars 22, 24 and 26 can go around curves, as well as side plates (not shown) that slide against each other to maintain coal containment. An articulated railcar is sometimes referred to as a "trough car." Thus, a continuous coal-receiving space is defined within each of the articulated railcars 22, 24 and 26, extending along all five sections. For purposes of the numerical example hereinbelow, each of the articulated railcars 22, 24 and 26 has a coal-carrying capacity of 250 tons (227 metric tons).

Although five-section articulated railcars 22, 24 and 26 are shown in the drawings, an articulated railcar may have many more sections, such as thirteen sections, and have a coal-carrying capacity of 500 tons (454 metric tons). Conversely, the train loading system 20 embodying the invention may be employed to load relatively smaller conventional railcars, having a coal-carrying capacity of 60 tons (54 metric tons).

Accordingly, it will be appreciated that the multiple-batch train loading system 20 is capable of accommodating railcars of a wide range of capacities and designs. It will further be appreciated that the number of batches required to load a railcar can vary greatly depending on the capacity of the particular railcar.

In the orientation of FIG. 1, the train 28 is moving from left to right, as indicated by an arrow 30, at a substantially constant rate within the approximate range of one-half mile per hour to one mile per hour (0.8 km/hr to 1.6 km/hr), while coal is loaded into the representative railcars 22, 24 and 26. Thus, the representative railcar 24 has a front portion 32 and a rear portion 34. In FIG. 1, the railcar 22 is fully loaded, the railcar 24 is being loaded, and the railcar 26 is empty, as it approaches the train loading system 20.

The multiple-batch train loading system 20 includes a surge bin 40 of conventional construction, and supported above the ground by a support structure (not shown). As an example, the surge bin 40 has a capacity of 150 tons (140 metric tons) of coal, a diameter of twenty-five feet (8 meters), and an overall height of approximately twenty-two feet (7 meters), extending from approximately forty-one feet (12 meters) above the ground to approximately sixty-three feet (19 meters) above the ground.

For supplying the surge bin 40 with coal 42 on a substantially continuous basis there is a particulate transport system 44 in the form of a conventional conveyor 44. The conveyor 44 operates continuously during the loading of the individual railcars of the train 28, and the surge bin 40 is never completely empty during the process of loading the cars of the train 28. (Thus, FIGS. 2-8, which depict operation of the multiple-batch train loading system 20, depict a quantity of coal 45 in the surge bin 40 at all times.) Still referring to FIG. 1, the feed rate of the conveyor 44 is variable so as to match what is required during the loading of a particular train 28.

Positioned below the surge bin 40 is a weigh bin 46, likewise of conventional construction, and supported above the ground by the support structure (not shown). As an example, the weigh bin 46 has a design capacity of forty-five tons (41 metric tons) of coal, a diameter of seventeen feet six inches (5 meters), and an overall height of approximately fifteen feet (4.5 meters), extending from approximately twenty-five feet (8 meters) to approximately forty feet (12 meters) above the ground. Likewise in a conventional manner, the weigh bin 46 is mounted such that the weight of the weigh bin 46 and the coal contained therein is supported by or otherwise transferred to at least one transducer 48, such as a load cell 48, having a weighing transducer output 50. In the schematic representation of FIG. 1, a dash line 52 represents a mechanical connection between the load cell 48 and the weigh bin 46 whereby the weight of the weigh bin 46 and coal contained therein is measured.

For charging batches of coal from the surge bin 40 into the weigh bin 46 there is a controlled and staged charging gate 60, operated by a modulated charging gate actuator 62, typically comprising a plurality of hydraulic cylinders and associated control valves, via a mechanical connection represented by dash line 64. The charging gate 60 may be of any suitable construction, having for example two or four charging gate elements (not shown), which may be referred to as "blades." A single charging gate element ("blade") may also be employed, provided it can be moved in stages. In any event, and as is known in the art, the charging gate 60 is selectively capable of both precision charging and non-precision charging batches of particulate material from the surge bin 40 into the weigh bin 46. Thus, in order to precisely make up a batch, the charging gate 60 is closed in stages so that coal initially flows rapidly into the weigh bin 46, and the rate of flow diminishes as the weight of coal in the weigh bin 46 approaches what is required for the particular batch. More precise shut off is therefore possible compared to when the charging gate 60 is not operated in a staged manner. In practice precision charging or batching is achieved by programming a plurality of weight set points. As each set point is reached one or more elements of the charging gate 60 are closed, and the charging gate 60 is completely closed when the last set point is reached. Alternatively, a single charging gate 60 element can be moved in stages, until completely closed. Precision batching can be achieved with as few as two set points.

Non-precision charging may alternatively be described as "single set point" charging, and precision charging may alternatively be described as "multiple set point" charging. In other words, for precision charging the charging gate 60 is capable of selective opening sizes in order to modulate the flow of coal into the weigh bin 46. The practical differences between precision charging and non-precision charging relate to the rate at which coal is charged into the weigh bin 46 (and thus the time required), and how closely the target weight for a particular batch can be achieved, in other words, how precisely a batch can be made up. (In both cases the actual weight of a batch within the weigh bin 46, as measured by the load cell 48, is accurately measured.) The faster a batch is made up, the less likely it is that a target weight for the batch is achieved with precision. Thus, a penalty associated with precision batching is that the time to make up the batch is increased. Stated another way, a smaller batch can be made up with greater precision than a larger batch in a given length of time.

In the case of "single set point" non-precision charging, the charging gate 60 is opened fully for maximum flow rate, and then closed when a weight set point as measured by the load cell 48 is reached. With "single set point" non-precision charging, to minimize the risk of overloading the weigh bin 46, the target batch weight should not exceed 90% of the weigh bin 46 design capacity. As a particular example, the flow rate with the charging gate 60 fully opened is 10 tons (9 metric tons) per second. It can be appreciated that, at that relatively high flow rate, there are multiple factors which complicate the selection of a set point at which to begin closing the charging gate 60. These factors include the amount of material in transit, the amount of material passing through the charging gate 60 while the charging gate 60 is in the process of closing, and the impact load of the material being registered by the load cell 48. These factors also make it impossible as a practical matter to achieve an accurate batch at high flow rates without multiple set points. A non-precision-charged batch is weighed accurately, but is not precisely made up to a particular weight.

In the case of "multiple set point" precision charging, the charging gate 60 may be initially opened fully for maximum flow rate, but is closed in stages as each of a plurality of weight set points as measured by the load cell 48 is reached. As the final set point is approached the charging gate 60 is closed to a stage where the flow rate is low enough to allow an accurate determination of material in the weigh bin 46 by the load cell 48, that is, at a rate at which the impact load of the material entering the weigh bin 46 does not unduly affect the weighing. The smaller amount of material in transit facilitates the determination of a relatively accurate and consistent set point resulting in precision-charged batches.

Related to the foregoing, the weigh bin 46 has a maximum available capacity, as well as a maximum target capacity for a non-precision-charged batch, the maximum target capacity for a non-precision-charged batch being less than the maximum available capacity. More particularly, a weigh bin 46 with a rated capacity of 45 tons (41 metric tons) has an overload factor of approximately 10% built into the rated capacity, and can in fact hold 50 tons (45 metric tons) of coal, as the maximum available capacity, before an overload condition is reached as indicated by a display associated with the load cell 48 blanking out. With "multiple set point" precision charging, the weigh bin can be charged to its maximum available capacity, but a relatively long time is required to do so. In contrast, with "single set point" charging, the maximum batch target capacity for a non-precision-charged batch is limited, for example to 42 tons (38 metric tons). With non-precision charging, even though the target weight of the batch is only 42 tons (38 metric tons), the actual weight of the batch has the possibility of approaching the 50 ton (45 metric ton) maximum available capacity. Thus there is a risk of overloading the weigh bin 46 even with a relatively low batch target weight.

Below the weigh bin 46 is a controlled discharge gate 66 of conventional construction, operated by a discharge gate actuator 68, also comprising a plurality of hydraulic cylinders and associated control valves, via a mechanical connection represented by dash line 70. The discharge gate discharges coal into a telescoping loading chute 72.

The telescoping loading chute 72 thus serves to convey coal from the weigh bin 46 into the individual railcars, such as the exemplary railcar 24. The telescoping loading chute 72 is of conventional construction, and has a fixed upper section 74 and a vertically movable lower section 76 controlled by a loading chute actuator 78 comprising a plurality of hydraulic cylinders, via a mechanical connection represented by dash line 80. The lower section 76 of the loading chute 72 has a discharge end 82, from which coal flows during a train loading operation.

Once a loading operation is underway, a so-called "plugged flow condition" is achieved, as is described hereinbelow with reference to FIG. 4, whereby a portion of the railcar 24 under the loading chute 72 is filled with coal substantially up to the discharge end 82 of the loading chute 72 such that the rate of flow out of the loading chute 72 into the railcar 24 is effectively controlled by forward movement of the train 28. Thus, in addition to its function as a conduit, the loading chute 72 serves a buffering function.

The train loading system 20 additionally includes a controller 84, such as a suitably-configured and programmed Allen-Bradley controller in combination with a suitably-programmed PC type computer. In a conventional manner, the controller 84 is connected via a representative line 86 to the weighing transducer output 50 so that the weight of the weigh bin 46 and its contents can be determined. In addition, the controller 84 is connected via representative control lines 88 and 90 to the charging gate actuator 62 and discharge gate actuator 68, so as to control the charging and discharging of the weigh bin 46. By another representative control line 92 connected to the loading gate actuator 78, the controller 84 controls the raising and lowering of the lower section 76 of the loading chute 72. It will be appreciated that the lines 86, 88, 90 and 92 are representative of any suitable technique by which data and control signals may be communicated, including, as examples, data multiplexing, techniques based on computer networking, as well as wireless links.

The overall operation is initiated and at least monitored by a human operator 94, who directs the overall operation of the controller 84 by means of a representative control input 96. The control input 96 is representative of various input devices, including, as examples, a keyboard, pushbuttons, switches and joysticks.

As is well known in the art, the multiple-batch train loading system 20 in addition includes a number of conventional control elements such as limit switches and other sensors, including various protective devices, for efficient and reliable operation of the train loading system 20. These include sensors (not shown) for monitoring the level of coal in the surge bin 40, as well as readers for reading identifying numbers from the individual railcars, such as bar-coded identifying numbers. In addition, there is equipment for handling test weights for weigh bin calibration purposes, as also is known in the art. In general, all the operator 94 has to do is to watch the railcars 24 as they approach the loading chute 72, and trigger the discharge gate 66 while causing the lower section 76 of the loading chute 72 to be lowered into the railcar, and thereafter causing the lower section 76 of the loading chute 72 to be raised to an appropriate height for loading coal into the representative car 24. As each car is loaded, the lower section 76 of the loading chute 72 must be raised so as to clear the gunwale, which can be done either under direction of the operator 94 visually monitoring the process, or triggered automatically by a limit switch or other protective device.

The controller 84, under direction of the operator 94, is operable to control operation of the train loading system to implement a multiple-batch method embodying the invention for loading successive railcars, such as the representative railcar 24, as is described next hereinbelow.

The controller 84 at least initially calculates the number and individual target weights of batches in order to load the railcar 24 to the car target weight based on an initial weighed batch 100 having a weight at least approximately equal to the maximum available capacity of the weigh bin 46, a final weighed batch 102 sized no larger than the amount of particulate material that can be precision-charged into the weigh bin 46 in the time it takes to completely empty the loading chute 72, and zero or more intermediate weighed batches (e.g. first intermediate weighed batch 104) sized no larger than the maximum target capacity of the weigh bin 46 for a non-precision-charged batch. Thus, depending on the capacity of a particular railcar, intermediate batches may or may not be required. The target weight for the final weighed batch 102, which is precision-charged into the weigh bin 46, is determined by the capacity of the railcar, as well as by the total actual weight of preceding batches. In the particular example described in detail herein, the car target weight is 250 tons (227 metric tons). The initial precision-charged weighed batch 100 has a target weight of 50 tons (45 metric tons). There are four intermediate non-precision-charged weighed batches, each with an initially-calculated target weight of 42.5 tons (38.5 metric tons). The final precision-charged weighed batch 102 has an initially-calculated target weight of 30 tons (27 metric tons). However, after the weigh bin 46 has been charged with each intermediate weighed batch, the number and individual target weights of any additional intermediate batches that may be required, as well as the target weight of the final precision-charged weighed batch, are re-calculated.

Figure 2:
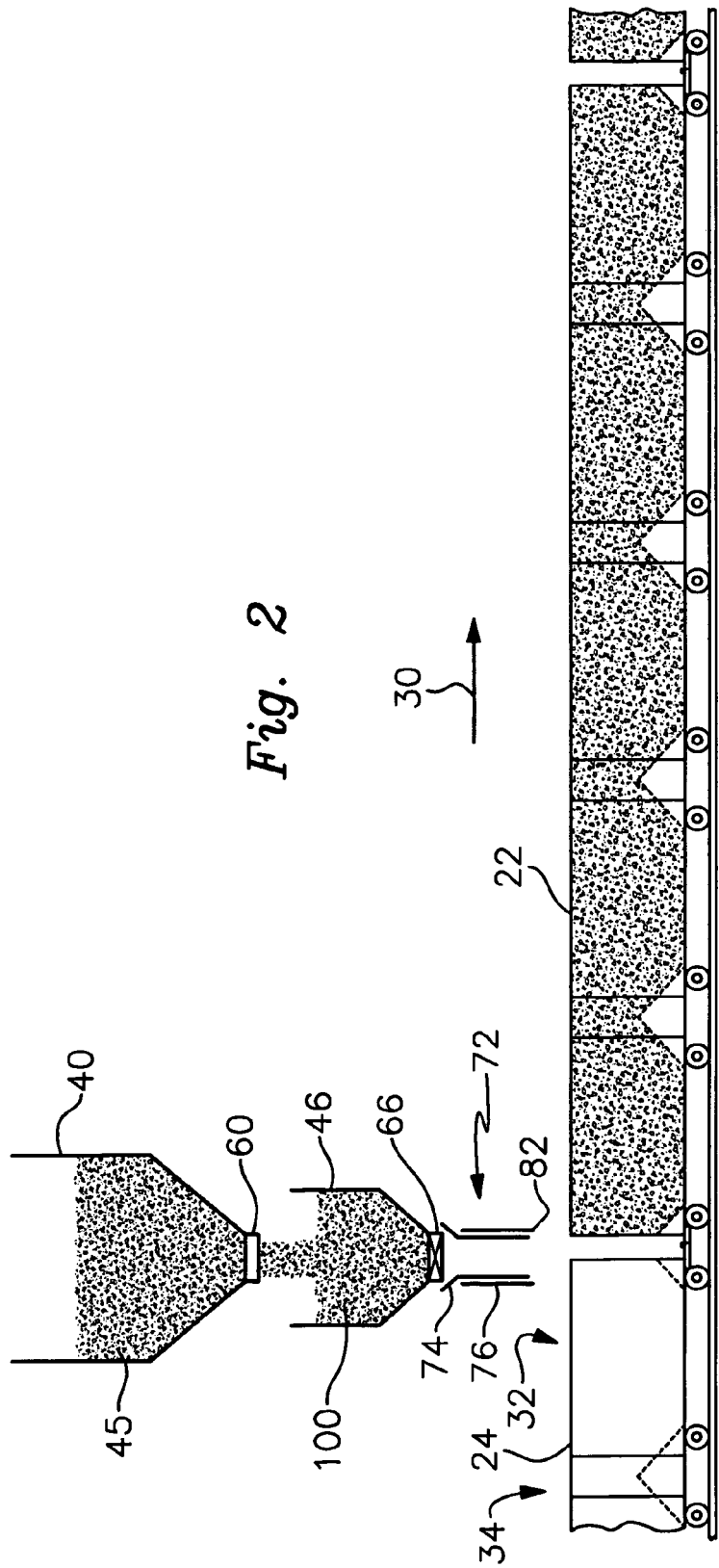
FIG. 2 depicts a condition during operation when the weigh bin is being precision-charged or loaded with the initial weighed batch of coal as a railcar to be loaded approaches.

With reference in addition to FIG. 2, as the representative railcar 24 approaches the loading chute 72 (with the lower section 76 raised to clear the cars 22 and 24), the weigh bin 46 is precision-charged with the initial weighed batch 100 of coal, which has a weight at least approximately equal to the maximum available capacity of the weigh bin 46. Thus, multiple set points are employed: The charging gate 60 may be initially opened fully for maximum flow rate, but is closed in stages as the load cell 48 output 50 is monitored and each of a plurality of weight set points is reached. The weigh bin 46 is thus precision-charged with the initial weighed batch 100 of coal. When the initial weighed batch 100 is made up, the charging gate 60 is fully closed. A relatively long time interval is available to make up the initial weighed batch 100, for example twenty seconds, between when the weigh bin 46 has been emptied of the final weighed batch of the previously-loaded railcar 22 as described hereinbelow with reference to FIG. 8, and the front end of the railcar 24 to be loaded arrives under the loading chute 72.

Advantageously, making the initial weighed batch 100 large (which is possible because it is a precision-charged batch), potentially decreases the number of intermediate non-precision-charged batches, and decreases the variability in the actual weight of the final weighed batch because the final weighed batch can be a relatively smaller batch.

Figure 3:
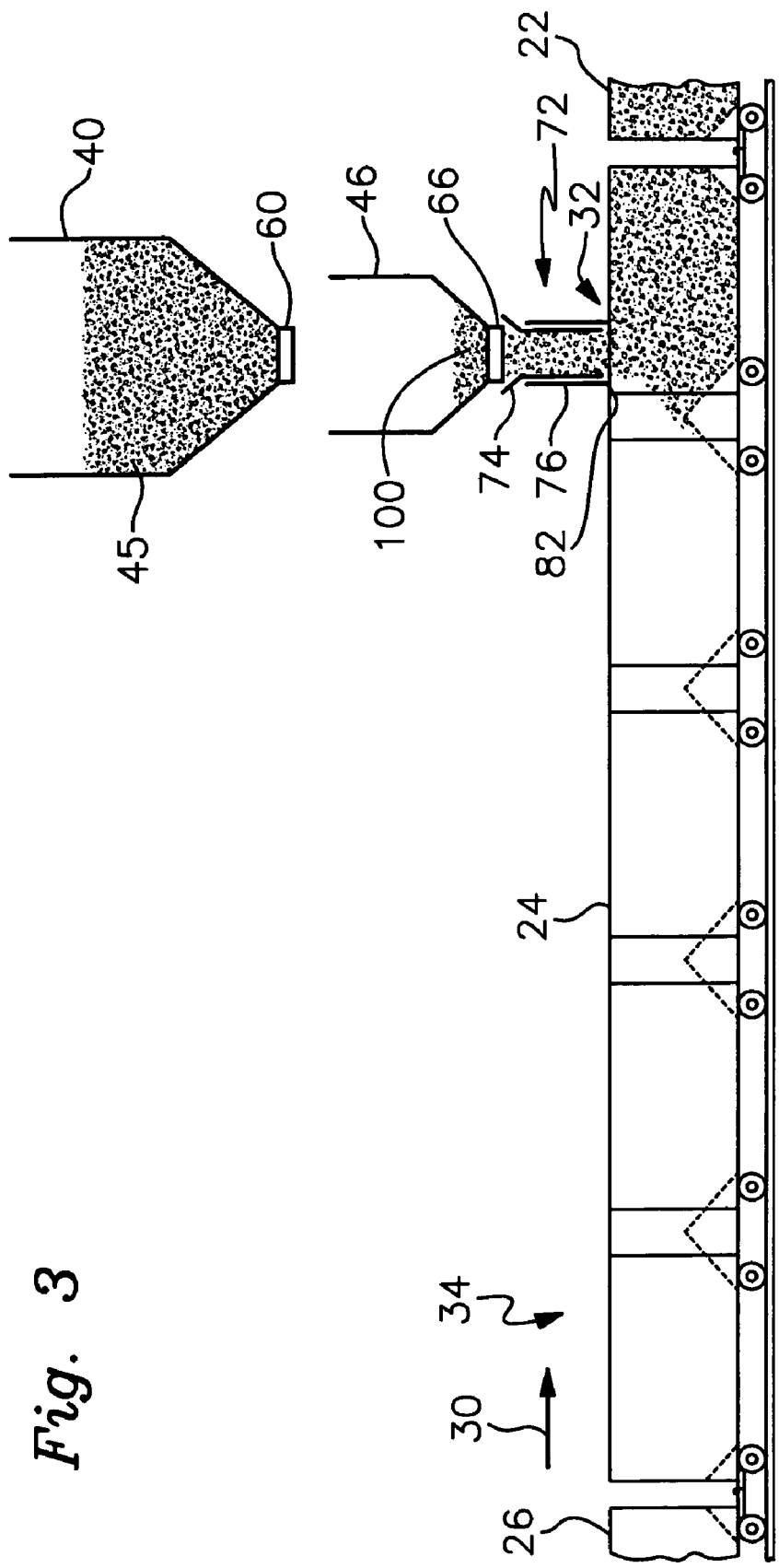
FIG. 3 depicts the initial weighed batch being discharged into the initially-empty railcar.
Figure 4:
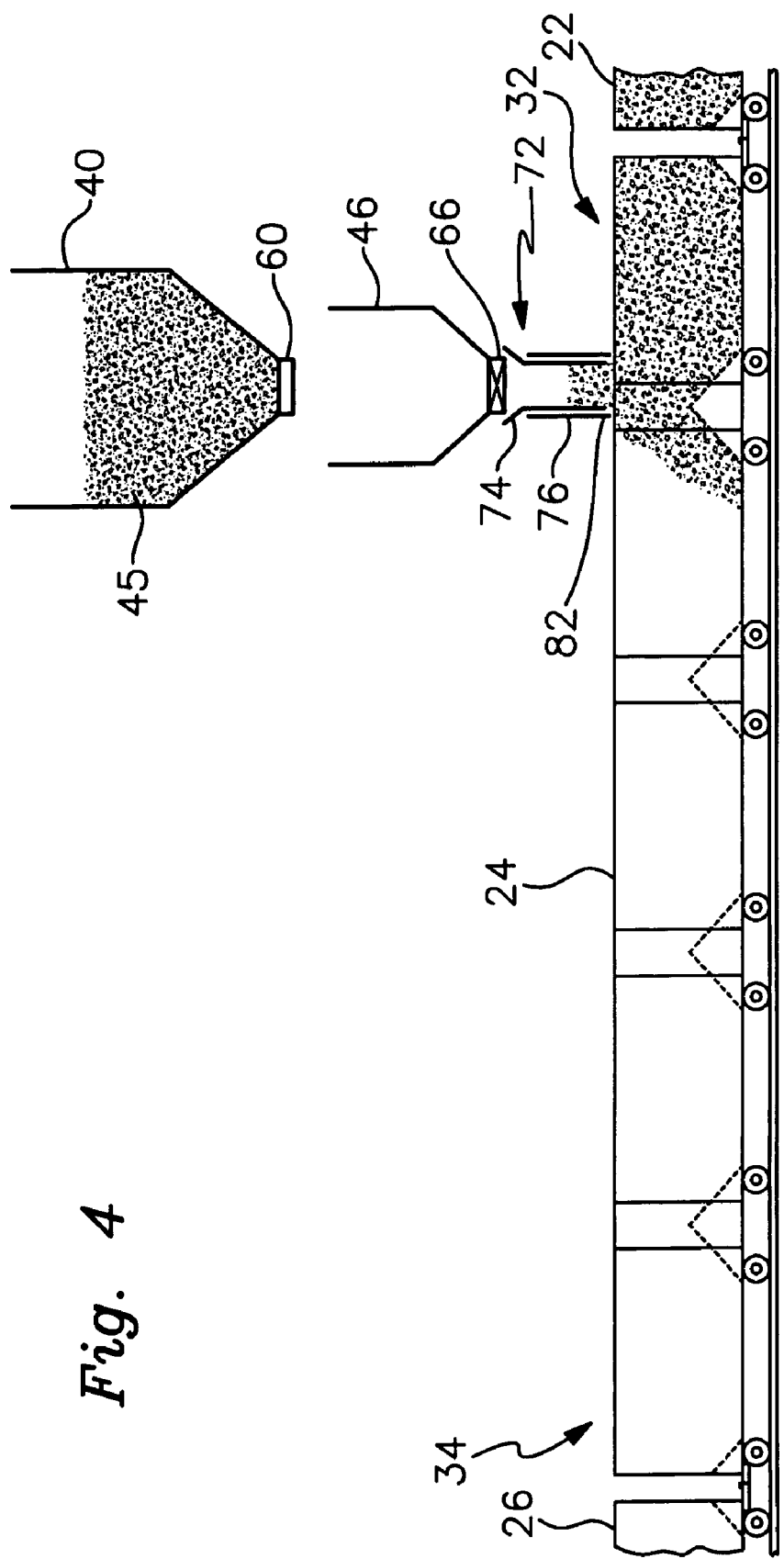
FIG. 4 depicts a condition during operation when the weigh bin is emptied of the initial weighed batch, with coal remaining in the loading chute, and the front portion of the car is filled up to the discharge end of the loading chute so as to achieve a "plugged flow condition;"

FIG. 3 depicts the initial weighed batch 100 being discharged into the front portion 32 of the car 24 prior to the level of coal in the car 24 reaching the discharge end 82 of the loading chute (with the lower section 76 now lowered), and FIG. 4 depicts a condition when the weigh bin 46 is emptied of the initial weighed batch 100. In FIG. 4, coal remains in the loading chute 72, and the front portion 32 of the railcar 24 is filled up to the discharge end 82 of the loading chute 72 so that subsequent flow of coal out of the loading chute 72, in a "plugged flow condition," is controlled by forward movement of the individual railcar 24.

In addition to the initial weighed batch 100 being sufficient to load the front portion 32 of the initially-empty railcar 24 all the way up to the discharge end 82 of the loading chute 72 so as to achieve a "plugged flow condition," the initial weighed batch 100 is sufficient to leave enough coal in the loading chute 72 so as to maintain a continuous flow of coal out of the loading chute 72 during an interval between when the weigh bin 46 is emptied of the initial batch 100 and the weigh bin 46 is charged with the next batch. (Depending on the size if the railcar and whether intermediate batches are required, the next batch may be the first intermediate weighed batch 104 (FIG. 5), or the final precision-charged weighed batch 102 (FIGS. 8 and 9)) In either case, the discharge gate 66 is opened to begin discharge of the next batch. Accordingly, a constant load profile is maintained in the railcar 24. Still referring to FIGS. 3 and 4, when the weigh bin 46 is completely emptied of the initial batch 100, as determined by the load cell 48 or by another appropriate sensor, the discharge gate 66 is closed.

Depending on the capacity of the railcar 24, and the individual batch capacity of the multiple-batch train loading system 20, one or more intermediate weighed batches may be required. In the illustrated example of the five-section articulated railcars 22, 24 and 26, each 100 feet (30 meters long), with a coal-carrying capacity of 250 tons (227 metric tons), four intermediate batches likely are required, in addition to the initial and final batches. In the case of longer articulated railcars, more intermediate batches are required. On the other hand, in the case of a relatively small conventional railcar, no (zero) intermediate batches may be required; the initial and final batches are sufficient to fully load the railcar.

Figure 5:
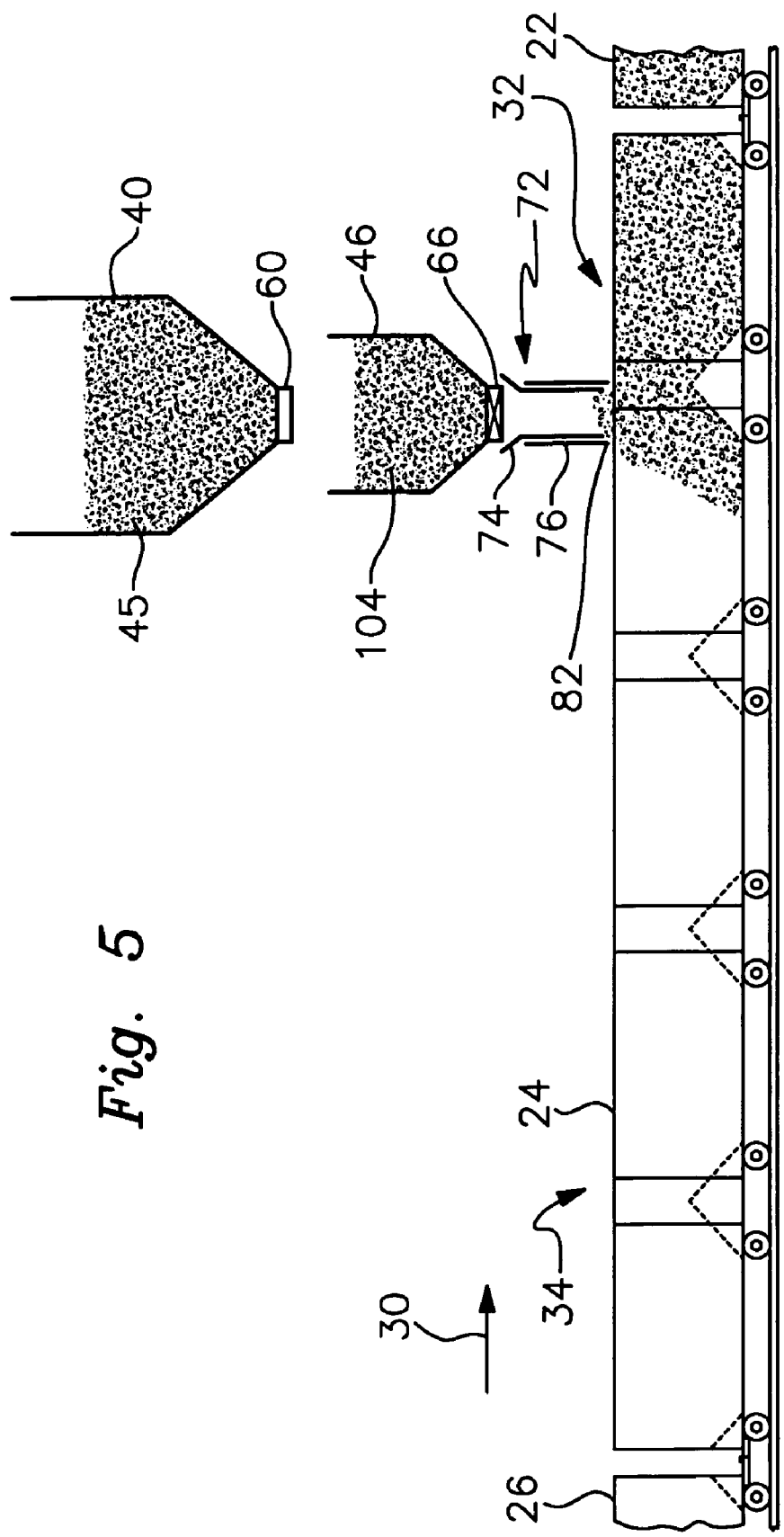
FIG. 5 depicts a condition during operation when a non-precision-charged first intermediate weighed batch (when required) has been made up in the weigh bin.

FIG. 5 depicts the condition when the first intermediate weighed batch 104 (when required) has been made up in the weigh bin 46, immediately prior to the discharge gate 66 being opened to discharge the first intermediate batch 104, and while coal from the initial batch 100 is still flowing out of the loading chute 72. Continuing for purposes of explanation with the numerical example herein, the first intermediate batch 104 has a target weight of 42.5 tons (38.5 metric tons). However, because the weigh bin 46 is rapidly non-precision-charged, the first intermediate batch 104 may have an actual weight ranging from 38 tons (34 metric tons) to 45 tons (41 metric tons). Thus, and leading up to the FIG. 5 condition, while material from the initial batch 100 (FIG. 2) is still flowing from the loading chute 72 into the individual railcar 24, the charging gate 60 is fully opened, while monitoring the load cell 48 output 50 using a single set point, so as to charge the weigh bin 46 with the first intermediate weighed batch 104 of material. When the first intermediate weighed batch 104 is made up, the charging gate 60 is closed. The first intermediate batch 104 is weighed accurately, but there is no requirement that it be precisely made up to its particular target weight. Thereafter, and before the loading chute 72 is empty, the discharge gate 66 is opened so as to discharge the first intermediate weighed batch 104, all the while maintaining a constant load profile in the railcar 24.

After the actual weight of the first intermediate weighed batch 104 has been determined (and again after the actual weight of each subsequent intermediate weighed batch, if any, has been determined), the controller 84 re-calculates the number and individual target weights of remaining batches required to load the railcar 24 to the car target weight. Parameters taken into account include the actual weight of the initial weighed batch 100 and the actual weight of the first intermediate weighed batch 104, as well as the car target weight. Further intermediate batches may or may not be required. The target weight for the final precision-charged weighed batch 102 is recalculated, again sized no larger than the amount of particulate material that can be precision-charged into the weigh bin 46 in the time it takes to completely empty the loading chute 72. Continuing with the numerical example being described herein, after re-calculation the remaining intermediate non-precision-charged weighed batches may each have a re-calculated target weight which is more or less than the initially-calculated 42.5 tons (38.5 metric tons). The final precision-charged weighed batch 102 likewise may have a re-calculated target weight which is more or less than the initially-calculated 30 tons (27 metric tons).

Figure 6:
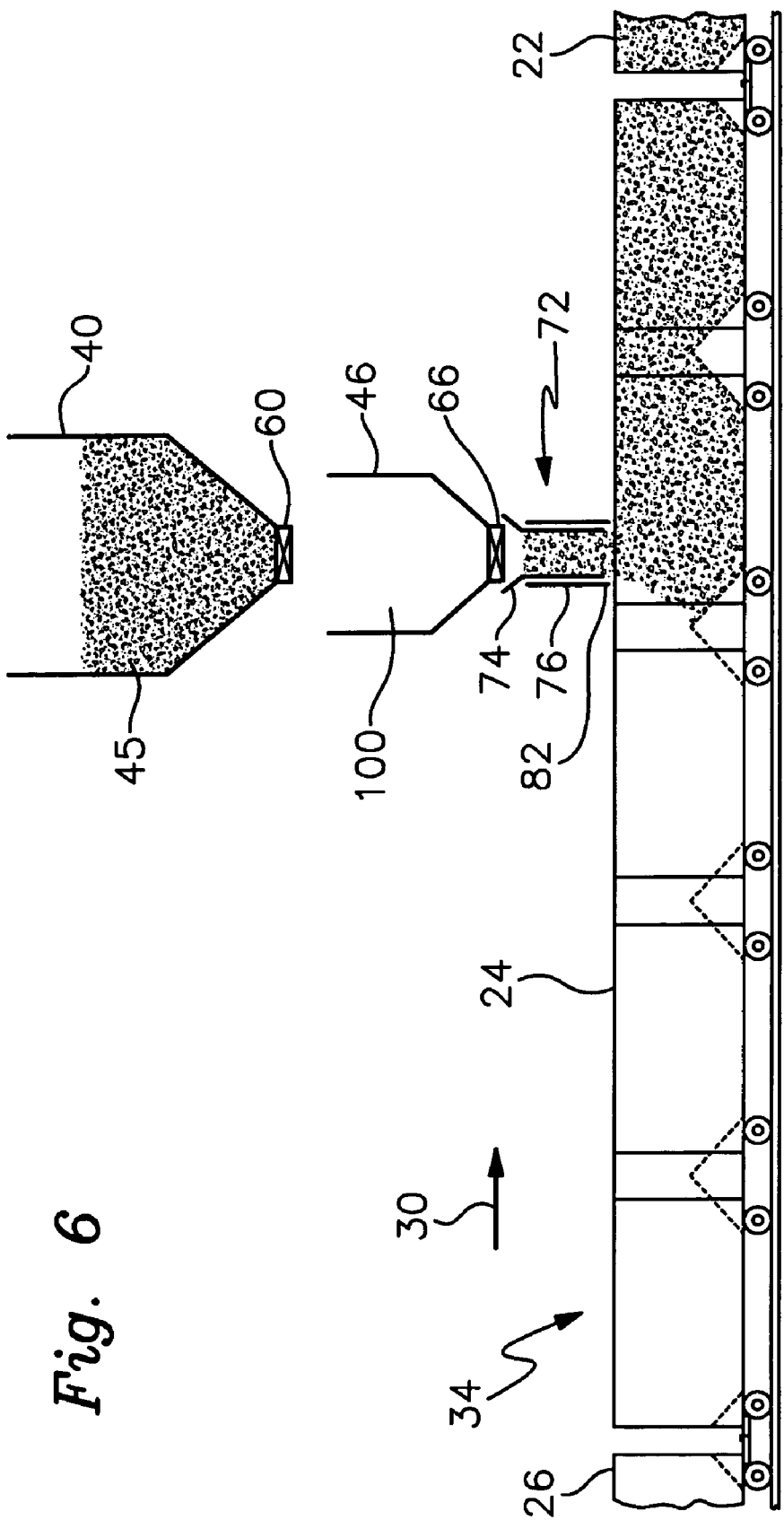
FIG. 6 depicts a condition during operation when the weigh bin is emptied of the first intermediate weighed batch, with coal remaining in the loading chute, and a "plugged flow condition" maintained.

FIG. 6 depicts the condition when the weigh bin 46 has been emptied of the first intermediate weighed batch 104, immediately prior to the next batch being made up. In FIG. 6, the discharge gate 66 is closed. The loading chute 72 is nearly full, allowing a "plugged flow condition" to be maintained without undue criticality while the next batch is made up. In the particular numerical example herein, the next batch to be made up is a non-precision-charged second intermediate batch (not shown). In the case of a smaller railcar where only one intermediate weighed batch is required, the next batch to be made up may be the final precision-charged weighed batch 102 (FIGS. 8 and 9).

Figure 7:
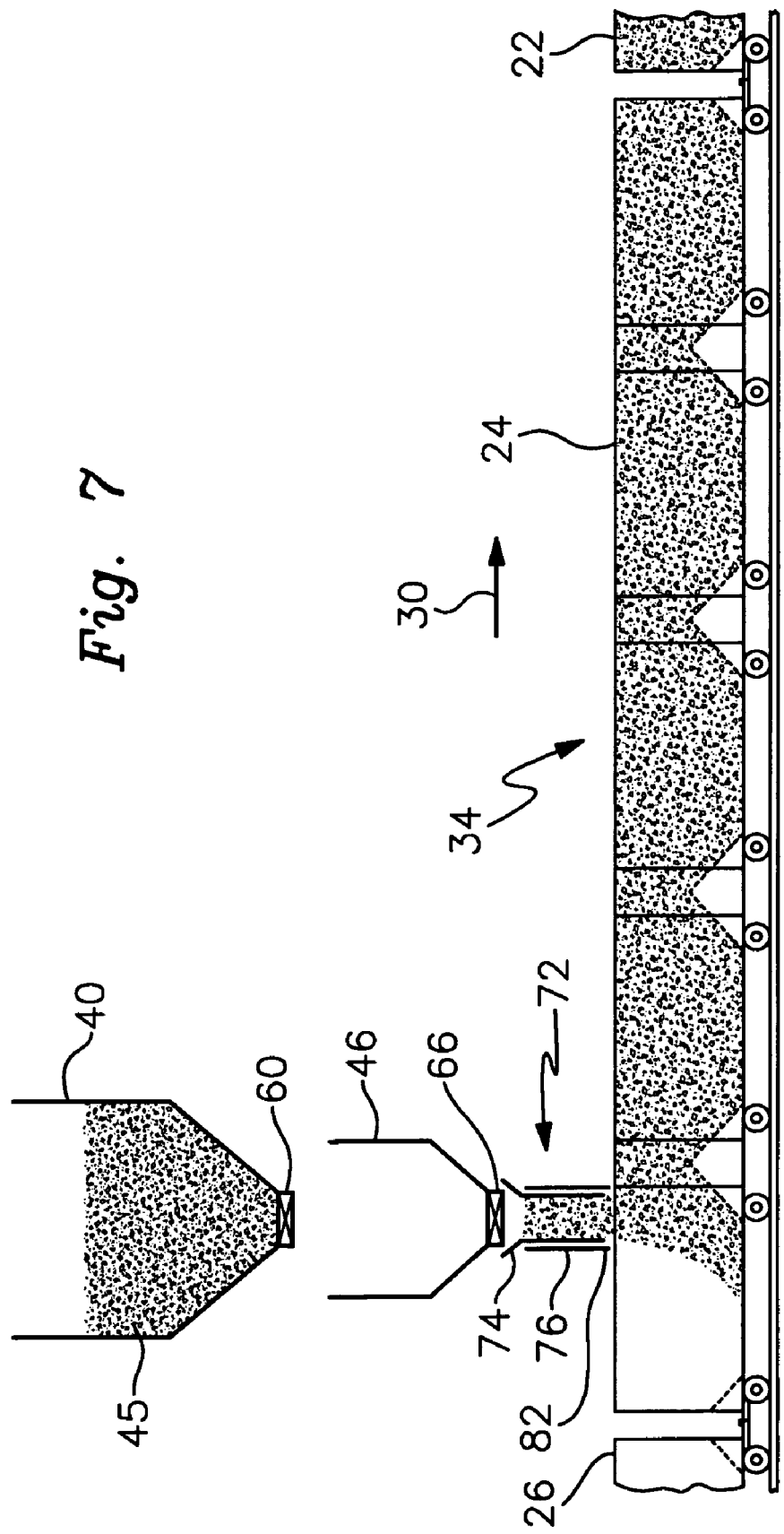
FIG. 7 depicts a condition during operation when the weigh bin is emptied of a non-precision-charged fourth intermediate batch (when required), with coal remaining in the loading chute, and a "plugged flow condition" maintained.

Although not specifically illustrated, in a similar manner the second, third and fourth non-precision-charged intermediate batches (in the particular numerical example described herein) are successively made up and loaded into the railcar 24, culminating in the condition represented in FIG. 7, which depicts the condition when the weigh bin 46 has been emptied of the fourth intermediate weighed batch (not shown), immediately prior to the final precision-charged weighed batch 102 (FIGS. 8 and 9) being made up. In FIG. 7, the discharge gate 66 is closed, and the loading chute 72 is nearly full, allowing a "plugged flow condition" to be maintained without undue criticality while the final and typically smaller precision-charged weighed batch 102 is made up. Again, after the actual weight of each intermediate weighed batch, including the fourth intermediate weighed batch, has been determined, the controller 84 re-calculates the number and individual target weights of remaining batches required to load the railcar 24 to the car target weight. Parameters taken into account include the actual weight of the initial weighed batch 100 and the actual weight of the each intermediate weighed batch, as well as the car target weight. The target weight of the final weighed batch 102 is recalculated, again sized no larger than the amount of particulate material that can be precision-charged into the weigh bin 46 in the time it takes to completely empty the loading chute 72. Continuing with the numerical example being described herein, the final precision-charged weighed batch 102 may have a re-calculated target weight which is more or less than the initially-calculated 30 tons (27 metric tons). In any event, since the final precision-charged weighed batch 102 is relatively smaller than the previous batches, sufficient time is available for precision charging when making up the batch, and variability in the actual weight of the final weighed batch is reduced.

Referring now specifically to FIG. 8, FIG. 8 depicts the condition when the final precision-charged weighed batch 102 has been made up in the weigh bin 46, immediately prior to the discharge gate 66 being opened to discharge the final weighed batch 102, and while coal from the previous batch, in this example the fourth intermediate batch, is still flowing out of the loading chute 72. While material from the fourth intermediate batch is still flowing from the loading chute 72 into the railcar 24, the charging gate 60 is opened for a third time, again while monitoring the weighing transducer output 50 of the load cell 48, so as to charge the weigh bin 46 with the final weighed batch 102 of coal. The target weight of the final precision-charged weighed batch 102 is what is required to reach the car target weight for the individual railcar 24 after all previous weighed batches are loaded into the railcar 24.

After the final precision-charged weighed batch 102 is made up the charging gate 60 is closed, but before the loading chute 72 is empty, the discharge gate 66 is opened so as to discharge the final weighed batch 102, again all the while maintaining a constant load profile in the railcar 24.

FIG. 9 depicts the final precision-charged weighed batch 102 being discharged through the discharge gate 66 and loading chute 72 into the railcar 24. When the weigh bin 46 is completely emptied of the final precision-charged weighed batch 102, the discharge gate 66 is closed, and the entire process is repeated to load the next car 26, in the same manner as has just been described beginning with FIG. 2. Still referring to FIG. 9, coal flows from the loading chute 72 until the railcar 24 is completely filled, which coincides with the complete emptying of the loading chute 72. The lower section 76 of the loading chute 72 is raised, if required, so as to clear the ends of the cars 24 and 26.

In view of the foregoing, it will be appreciated that embodiments of the invention provide multiple-batch train loading systems and methods, for example for loading coal, which are capable of accommodating railcars of a wide range of capacities and designs. Each railcar is loaded with at least the relatively large initial weighed batch 100 having a weight at least approximately equal to the maximum available capacity of the weigh bin, and the relatively small final weighed batch 102. The initial weighed batch 100 and the final weighed batch 102 are both made up with precision, employing multiple weight set points. If required, one or more intermediate weighed batches (for example batch 104) are loaded into the railcar. Intermediate batches, if required, are made up rapidly, employing a single weight set point, but not necessarily with precision. Advantageously, making the initial weighed batch 100 large (which is possible because it is a precision-charged batch), potentially decreases the number of intermediate non-precision-charged batches, and decreases the variability in the actual weight of the final weighed batch 102 because the final weighed batch 102 can be a relatively smaller batch. Also, because the final weighed batch 102 is relatively smaller, sufficient time is available to make it up with precision. There is no requirement that the intermediate batches be made up with precision, so they can be made up rapidly.

While an exemplary embodiment of the invention has been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. A multiple-batch method capable of accommodating railcars of a wide range of capacities and designs for loading a moving railcar from front to back with a car target weight of particulate material employing a train loading system including a surge bin, a weigh bin having a maximum available capacity as well as a maximum target capacity for a non-precision-charged batch positioned below the surge bin, the maximum target capacity for a non-precision-charged batch being less than the maximum available capacity, a controlled and staged charging gate for selectively charging both precision-charged and non-precision-charged batches of particulate material from the surge bin into the weigh bin, and a controlled discharge gate for discharging particulate material from the weigh bin through a loading chute into the railcar, said method comprising the steps of:

at least initially calculating the number and individual target weights of batches in order to load the railcar to the car target weight based on an initial weighed batch having a weight at least approximately equal to the maximum available capacity of the weigh bin, a final weighed batch sized no larger than the amount of particulate material that can be precision-charged into the weigh bin in the time it takes to completely empty the loading chute, and zero or more intermediate weighed batches sized no larger than the maximum target capacity of the weigh bin for a non-precision-charged batch;

as the railcar approaches the loading chute, precision-charging the weigh bin with the initial weighed batch of material, and then discharging the initial batch from the weigh bin through the loading chute into the railcar;

if one or more intermediate weighed batches are required, while material from a previous batch is flowing from the loading chute into the railcar, non-precision-charging the weigh bin with each intermediate batch of material, and then discharging each intermediate batch from the weigh bin through the loading chute into the railcar; and while material from a previous batch is flowing from the loading chute into the railcar, precision-charging the weigh bin with the final weighed batch, the weight of the final weighed batch being what is required to reach the car target weight after the initial and any intermediate weighed batches are weighed and loaded into the railcar, and then discharging the final batch from the weigh bin through the loading chute into the railcar.

2. The method of claim 1, which further comprises, in the event one or more intermediate weighed batches are required, after the weigh bin has been charged with each intermediate weighed batch, re-calculating the number and individual target weights of any additional intermediate batches that may be required, as well as the target weight of the final weighed batch.

3. A train loading system for loading successive railcars of a moving train with respective car target weights of particulate material, said system capable of accommodating railcars of a wide range of capacities and designs, and said system comprising:

a surge bin;

a weigh bin positioned below said surge bin, said weigh bin having a maximum available capacity as well as a maximum target capacity for a non-precision-charged batch, the maximum target capacity for a non-precision-charged batch being less than the maximum available capacity, and at least one transducer connected to said weigh bin for measuring the weight of said weigh bin and particulate material contained therein, said at least one transducer having a weighing transducer output;

a controlled and staged charging gate with selective opening sizes for selectively charging both precision-charged and non-precision-charged batches of particulate material from said surge bin into said weigh bin;

a loading chute positioned below said weigh bin for conveying particulate material from said weigh bin into the railcars;

a controlled discharge gate for discharging particulate material from said weigh bin; and a controller connected to said transducer output for determining the weight of said weigh bin and particulate material contained therein, connected to said charging gate for controlling the charging of said weigh bin, and connected to said discharge gate for controlling discharging from said weigh bin, said controller operable, to at least initially calculate the number and individual target weights of batches in order to load the railcar to the car target weight based on an initial weighed batch having a weight at least approximately equal to the maximum available capacity of said weigh bin, a final weighed batch sized no larger than the amount of particulate material that can be precision-charged into said weigh bin in the time it takes to completely empty said loading chute, and zero or more intermediate weighed batches sized no larger than the maximum target capacity of said weigh bin for a non-precision-charged batch, as an individual railcar approaches said loading chute, to open said charging gate and then close said charging gate in stages, while monitoring said weighing transducer output, so as to precision-charge said weigh bin with the initial weighed batch of material, to open said discharge gate, and then to close said discharge gate when said weigh bin is empty, so as to discharge the initial batch from said weigh bin through said loading chute into the railcar, if one or more intermediate weighed batches are required, while material from a previous batch is flowing from said loading chute into the railcar, to open said charging gate, while monitoring said weighing transducer output, so as to non-precision-charge said weigh bin with each intermediate batch of material, to open said discharge gate, and then to close said discharge gate when said weigh bin is empty, so as to discharge each intermediate batch from said weigh bin through said loading chute into the railcar, while material from a previous batch is flowing from said loading chute into the railcar, to open said charging gate and then close said charging gate in stages, while monitoring said weighing transducer output, so as to precision-charge said weigh bin with the final weighed batch, the weight of the final weighed batch being what is required to reach the car target weight after the initial and any intermediate weighed batches are weighed and loaded into the railcar, and to open said discharge gate, and then to close said discharge gate when said weigh bin is empty so as to discharge the final batch from said weigh bin through said loading chute into the railcar.

4. The train loading system of claim 3, wherein said controller is further operable, in the event one or more intermediate weighed batches are required, after said weigh bin has been charged with each intermediate weighed batch, to re-calculate the number and individual target weights of any additional intermediate batches that may be required, as well as the target weight of the final weighed batch.

* * * * *